(12) United States Patent
Tieu

(10) Patent No.: US 7,023,155 B2
(45) Date of Patent: Apr. 4, 2006

(54) SPINDLE MOTOR ACCELERATION CONTROL

(75) Inventor: Triet Minh Tieu, Edmond, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/455,206

(22) Filed: Jun. 5, 2003

(65) Prior Publication Data

US 2004/0251861 A1    Dec. 16, 2004

(51) Int. Cl.
G11B 19/20    (2006.01)
G11B 21/02    (2006.01)

(52) U.S. Cl. ............... 318/276; 318/560; 318/561; 360/70; 360/73.03

(58) Field of Classification Search ............. 318/434, 318/439, 599, 600, 603, 254, 138, 245, 560, 318/561; 360/73.03, 75, 70
See application file for complete search history.

(56) References Cited

U.S. PATENT DOCUMENTS

| | | | |
|---|---|---|---|
| 4,992,710 A | | 2/1991 | Cassat |
| 5,001,405 A | | 3/1991 | Cassat |
| 5,028,852 A | | 7/1991 | Dunfield |
| 5,117,165 A | | 5/1992 | Cassat et al. |
| 5,343,127 A | * | 8/1994 | Maiocchi ............... 318/254 |
| 5,793,558 A | | 8/1998 | Codilian et al. |
| 5,841,252 A | | 11/1998 | Dunfield |
| 5,982,571 A | * | 11/1999 | Calfee et al. ........... 360/70 |
| 5,990,656 A | * | 11/1999 | Kardash ............... 318/807 |
| 6,078,158 A | | 6/2000 | Heeren et al. |
| 6,104,153 A | * | 8/2000 | Codilian et al. ............ 318/362 |
| 6,153,989 A | * | 11/2000 | Kardash et al. ............ 318/254 |
| 6,178,060 B1 | | 1/2001 | Liu |
| 6,198,590 B1 | * | 3/2001 | Codilian et al. ........ 360/73.03 |
| 2002/0167287 A1 | * | 11/2002 | Heydt et al. ............. 318/254 |
| 2004/0012355 A1 | * | 1/2004 | Sosseh et al. ........... 318/439 |
| 2004/0036436 A1 | * | 2/2004 | Tieu .......................... 318/439 |
| 2004/0245950 A1 | | 12/2004 | Ang et al. |

FOREIGN PATENT DOCUMENTS

| | | |
|---|---|---|
| EP | 0462729 A2 | 12/1991 |
| EP | 1221764 A1 | 1/2001 |

* cited by examiner

*Primary Examiner*—Paul Ip
(74) *Attorney, Agent, or Firm*—David K. Lucente; Derek J. Berger

(57) ABSTRACT

Method and apparatus for accelerating a multi-phase motor having a rotatable rotor is disclosed. A first commutation state in which the rotor resides is identified, a first position of the rotor within the first commutation state is determined (preferably within one to two electrical degrees), and a travel distance for the rotor to advance from the first position to a second position is determined. An optimized activation time is next determined for utilizing substantially all available motor torque, and a first drive pulse is applied for the activation time to advance the rotor to the second position. The process is repeated until an intermediate velocity is reached, after which back electromotive force (bemf) commutation is used for control of the motor. The apparatus includes a controller programmed with routines that utilize speeds and accelerations of the motor in accordance with basic Newtonian laws to determine optimized activation times.

17 Claims, 8 Drawing Sheets

SPINDLE MOTOR ACCELERATION CONTROL

FIELD OF THE INVENTION

The claimed invention relates by and large to motor control systems and more particularly, but not by way of limitation, to a method and apparatus for accelerating an electrically commutated brushless direct current (dc) spindle motor such as the type used in a data storage device to rotate a data recording disc.

BACKGROUND

Electrically commutated, brushless direct current (DC) motors (spindle motors) are inductive motors used in a wide variety of commercial applications. One common application of such motors is in data storage devices, which use the motors to rotate one or more axially aligned data recording discs at a constant high speed (such as 15,000 revolutions per minute, rpm). As the discs are rotated, data transducing heads are controllably moved across the disc surfaces to access concentric tracks to which data are stored.

A spindle motor incorporates a stationary stator portion which supports multiple phase windings which are electrically connected in a star or delta configuration. A rotatable rotor supports a corresponding array of permanent magnets adjacent the windings.

The rotor is rotated by electrically commutating the phase windings in a selected sequence. During each commutation period, drive current is input to one phase, output from another phase, and the remaining phase(s) are held at high impedance.

Market pressures continue to push for electronic devices with improved response times and reliability. As such, challenges remain and a need persists for improvements in the area of spindle motor control, and it is to such improvements that the present invention is directed.

SUMMARY OF THE INVENTION

In accordance with preferred embodiments, a method and an apparatus are provided for controlling acceleration of a multi-phase motor such as used in a data storage device.

The method preferably includes initially determining a substantially accurate position of a rotor of the multi-phase motor while the motor is at rest. This in essence is carried out by applying a measurement current to selected windings of the motor for a predetermined period of time. This results in identification of a first position of the motor, comprising which commutation state the motor is initially residing (a first commutation state), as well as the position of the motor within the first commutation state (within about one to two electrical degrees).

The first position is used to determine a rotational travel distance required to advance the rotor to a second position comprising a selected commutation point of the next (second) commutation state. An optimized activation time for a motor driver is determined preferably based on the rotational travel distance and static characteristics of the motor.

A driver circuit next accelerates the rotor from the first position to the second position for a duration of time nominally equal to the substantially optimized activation time, thereby utilizing substantially all available motor torque.

This process is repeated until the rotor reaches a velocity at which sufficient back electromagnetic force (bemf) is generated to be reliably detected, at which point bemf detection circuitry proceeds to accelerate the rotor to the final operational velocity in a closed loop mode.

The apparatus preferably comprises a control circuit configured to substantially carry out the foregoing steps to accelerate the motor from rest to the final operational velocity. The control circuit preferably comprises a programmable controller with associated programming routines, and a driver circuit which selectively applies current drive pulses to the motor.

To a large extent, acceleration of the motor in this manner provides improved motor acceleration characteristics', including faster acceleration from rest to the final operational velocity since substantially all of the available torque is used to accelerate the motor. Improved current control characteristics (including reduced current spiking) are also obtained, and cogging and motor reversals are substantially avoided.

These and various other features and advantages which characterize the claimed invention will become apparent upon reading the following detailed description and upon reviewing the associated drawings.

DETAILED DESCRIPTION

Figure 1:
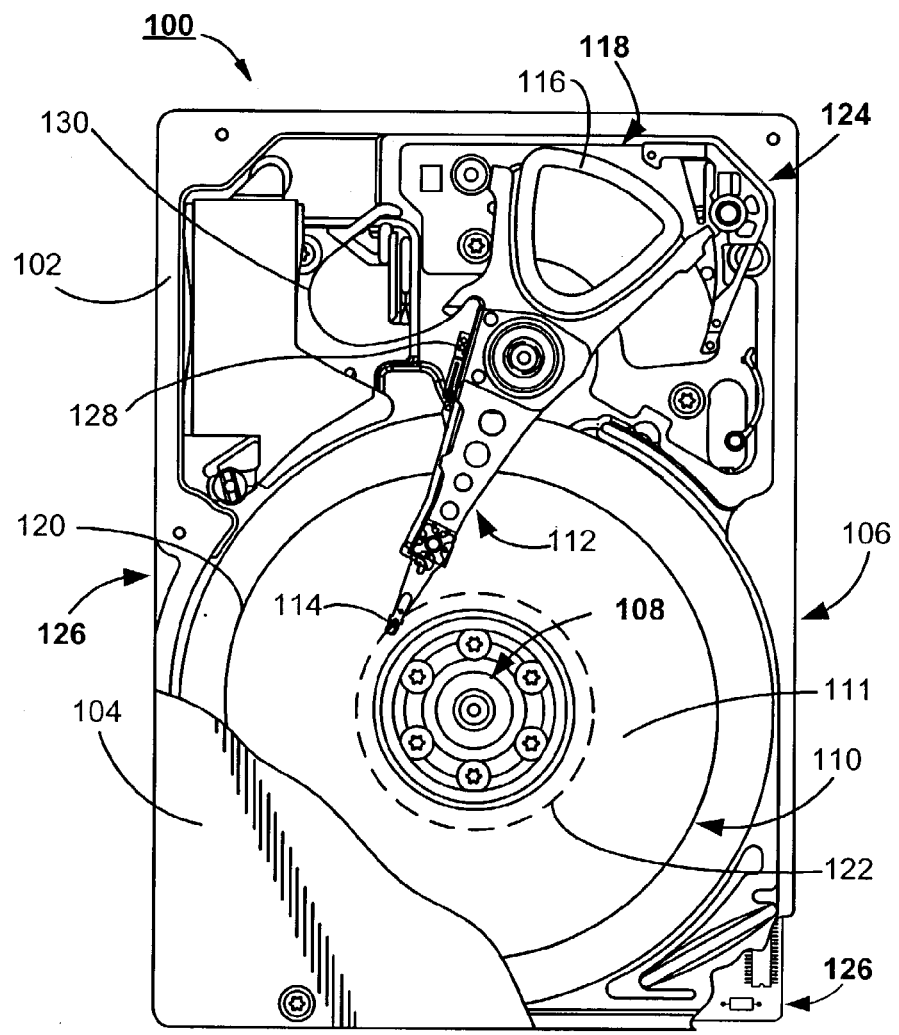
FIG. 1 is a top plan view of a data storage device (DSD) that incorporates motor winding inductive rise time measurements for motor acceleration control of a spindle motor assembly in accordance with preferred embodiments.

Referring now to the drawings, FIG. 1 provides a top plan view of a data storage device 100 (also referred to as device 100). The device 100 includes a rigid base deck 102 cooperating with a top cover 104 (shown in partial cutaway) to form a sealed housing for a mechanical portion of the device 100, referred to as a head-disc assembly 106.

A spindle motor assembly 108 (also referred to as motor 108) rotates a number of data storage discs 110 with a magnetic recording surface 111 at a substantially constant operational speed. Each disc 110 includes at least one magnetic recording surface 111. A rotary actuator 112 supports and rotates a number of read/write heads 114 adjacent the magnetic recording surfaces 111 when current is applied to a coil 116 of a voice coil motor (VCM) 118.

During operation of the device 100, the actuator 112 moves the heads 114 to data tracks 120 on the surfaces 111 to write data to and read data from the discs 110. When the device 100 is deactivated, the actuator 112 positions the heads 114 adjacent a home position 122 and the actuator 112 is confined by latching a toggle latch 124.

Command, control and interface electronics for the device 100 are provided on a printed circuit board assembly 126 mounted to the head-disc assembly 106. During data transfer operations, a preamplifier/driver (preamp) 128 attached to a flex circuit 130 conditions read/write signals conducted by the flex circuit 130 between the printed circuit board assembly 126 and the read/write head 114.

Figure 2:
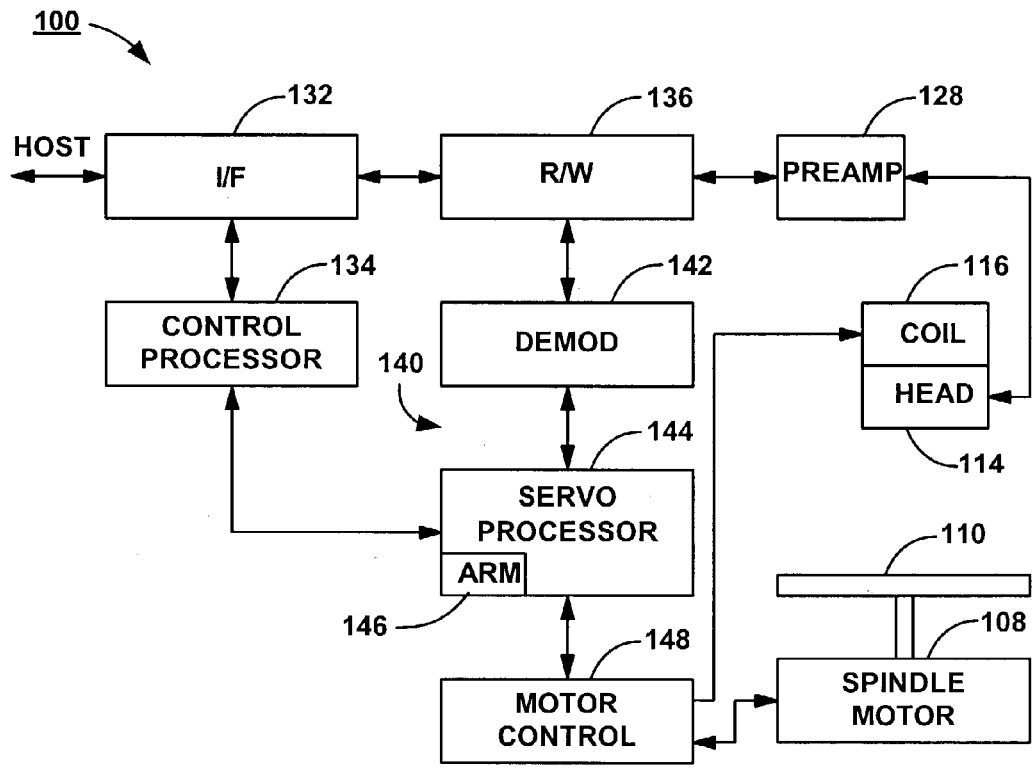
FIG. 2 is a functional block diagram of a circuit for controlling operation of the DSD of FIG. 1 including a controller with motor acceleration control code programmed into the controller.

FIG. 2 provides a functional block diagram showing control circuitry provided by the printed circuit board assembly 126 of the device 100 (of FIG. 1).

Data and host commands are provided from a host device to the device 100 using interface (I/F) circuitry 132 in conjunction with a top level control processor 134. Data are transferred between the discs 110 and the host device using the read/write head 114, the preamplifier/driver (preamp) circuit 128, a read/write (R/W) channel 136 and the I/F circuitry 132.

Head positional control is provided by a closed-loop servo circuit 140 comprising demodulation (demod) circuitry 142, a servo processor 144 (preferably comprising an Advanced RISC Machine, or ARM 146) and motor control circuitry 148. The motor control circuitry 148 applies drive currents to the actuator coil 116 to rotate the actuator 112. The motor control circuitry 148 further applies drive signals to the motor 108 to rotate the discs 110.

The motor 108 utilizes a three-phase, y-connected configuration (without a separate center tap connection line). However, it will be readily understood that this is for purposes of illustration and is not limiting to the scope of the invention as claimed below.

Figure 3:
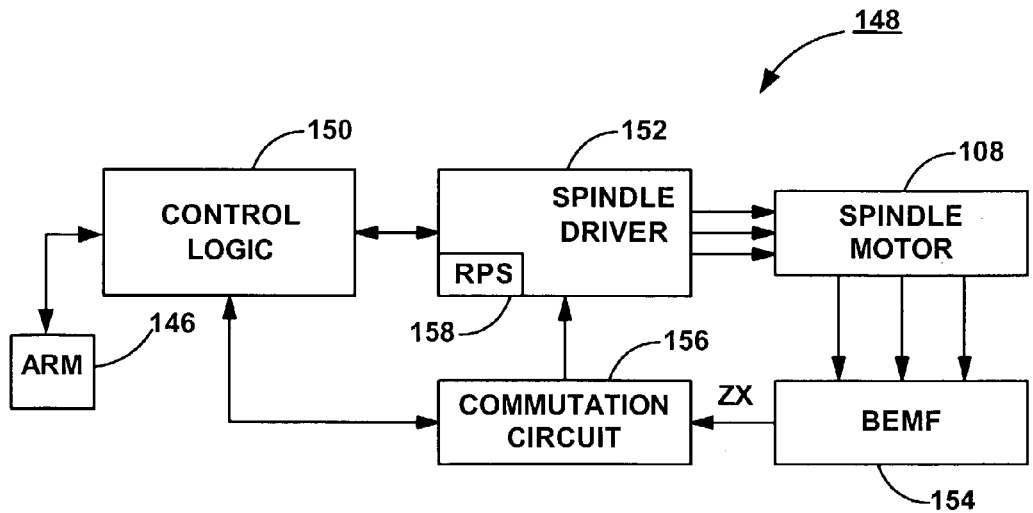
FIG. 3 is a functional block diagram of a motor control circuit controlling the motor of the DSD of FIG. 1.

FIG. 3 provides a functional block diagram of relevant portions of the motor control circuitry 148 of FIG. 2. Control logic 150 receives commands from and outputs state data to the ARM 146. Spindle driver circuitry (driver) 152 applies drive currents to the phases of the motor 108 over a number of sequential commutation steps to rotate the motor 108. During each commutation step, current is applied to one phase, sunk from another phase, and a third phase is held at a high impedance in an unenergized state. This mode is referred to as a six state mode.

Back electromotive force (Bemf) detection circuitry 154 measures the bemf generated on the unenergized phase, compares this voltage to the voltage at a center tap, and outputs a zero crossing (ZX) signal when the bemf voltage changes polarity with respect to the voltage at the center tap.

A commutation circuit 156 uses the ZX signals to time the application of the next commutation step.

The driver 152 includes rotor position sense (RPS) circuitry 158 to detect electrical position of the motor 108 in a manner to be discussed shortly. At this point, however, it will be noted that by determining a substantially accurate rotor position with the RPS circuit 158, and with knowledge of a desired destination and performance characteristics of the motor 108, the rotor can be advanced through use of substantially all available motor torque.

Figure 4:
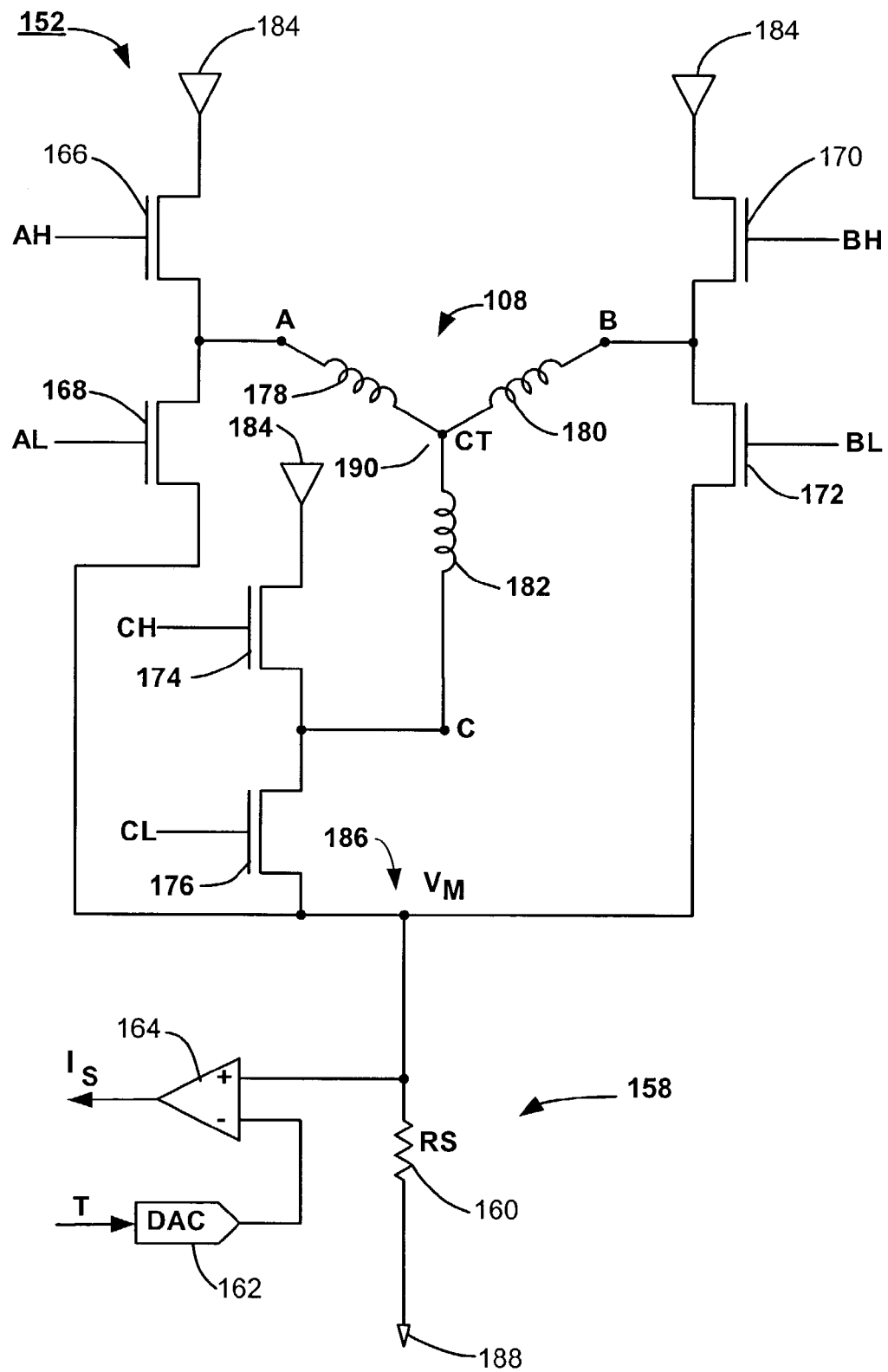
FIG. 4 is a schematic diagram of a motor driver of the DSD of FIG. 1.

The RPS circuitry 158 includes a sense resistor (RS) 160, a digital to analog converter (DAC) 162 and a comparator 164. FIG. 4 also shows the driver 152 to include six field effect transistors (FETs) 166, 168, 170, 172, 174 and 176, with inputs denoted as AH (A high), AL (A low), BH, BL, CH and CL, respectively.

Controlled and timed application of drive currents to the various FETs result in flow of current through current entry points A, B and C phase windings 178, 180 and 182. The drive currents flow from a voltage source 184 to sense voltage node 186, through the RS 160 to reference node (ground) 188. For the six state mode, the motor commutation steps (states) are defined in Table 1:

TABLE 1

| Commutation State | Source Phase | Sink Phase | Phase Held at High Impedance |
|---|---|---|---|
| 1 | A | B | C |
| 2 | A | C | B |
| 3 | B | C | A |
| 4 | B | A | C |
| 5 | C | A | B |
| 6 | C | B | A |

For the six state mode, during commutation step 1, phase A (winding 178) is supplied with current, phase B (winding 180) outputs (sinks) current, and phase C (winding 182) is held at high impedance. This is accomplished by selectively turning on AH FET 166 and BL FET 172, and turning off AL FET 168, BH FET 170, CH FET 174 and CL FET 176. In this way, current flows from source 184, through AH FET 166, through A phase winding 178, through the center tap (CT node 190), through B phase winding 180, through BL FET 172 to $V_M$ node 186, and through RS 160 to ground 188.

The resulting current flow through the A and B phase windings 178, 180 induce electromagnetic fields which interact with a corresponding array of permanent magnets (not shown) mounted to the rotor (rotor hub), thus inducing a torque upon the rotor hub in the desired rotational direction. The appropriate FETs are sequentially selected to achieve the remaining commutation states shown in Table 1.

It will be noted that each cycle through the six commutation states of Table 1 comprises one electrical revolution of the motor. The number of electrical revolutions in a physical, mechanical revolution of the motor 108 is determined by the number of poles. With 3 phases, a 12 pole motor will have six electrical revolutions for each mechanical revolution of the motor.

For a three phase motor, the frequency at which the motor 108 is commutated, referred to as the commutation frequency FCOM, is determined as follows:

$$FCOM = (phases)(poles)(RPM)/60 \qquad (1)$$

A three-phase, 12 pole motor operated at 15,000 revolutions per minute would produce a commutation frequency of:

$$FCOM=(3)(12)(15,000)/60=9,000 \quad (2)$$

or 9 kHz. The commutation circuit 156 (of FIG. 3) will thus commutate the driver 152 at nominally this frequency to maintain the motor 108 at the desired operational velocity up to and in excess of 15,000 rpm. The foregoing relations can be used to determine the actual motor speed (and therefore speed error) in relation to the frequency at which the zero crossing ZX pulses are provided from the bemf detection circuitry 154 (of FIG. 3).

During operation, the motor control circuit 148 (of FIG. 2) receives input command velocity values and provides a corresponding output range of velocities of the motor 108 from a lower threshold velocity to an upper operational velocity. The threshold velocity is defined as a relatively low velocity of the motor. The operational velocity is the velocity at which the motor is normally operated during data transfer operations.

Velocities above the threshold velocity are high enough to enable the power electronics and speed controllers to regulate the velocity of the motor. Below the threshold velocity, the control circuitry is not effective at regulating the velocity of the motor. More specifically, as a result of limitations in the control electronics, the servo code is limited as to the minimum current that can be provided. Commanded velocity values for velocities below the threshold velocity still results in the minimum current value, not a lower current value required for slower motor operation. The control electronics thus limit the current and velocity to minimum values.

These respective velocities can take any number of relative values depending on the particular application, and are related to the specific construction of the motor. For purposes of the present discussion, illustrative values are about 500 to 800 revolutions per minute (rpm) for the threshold velocity and about 15,000 rpm for the operational velocity.

Figure 5:
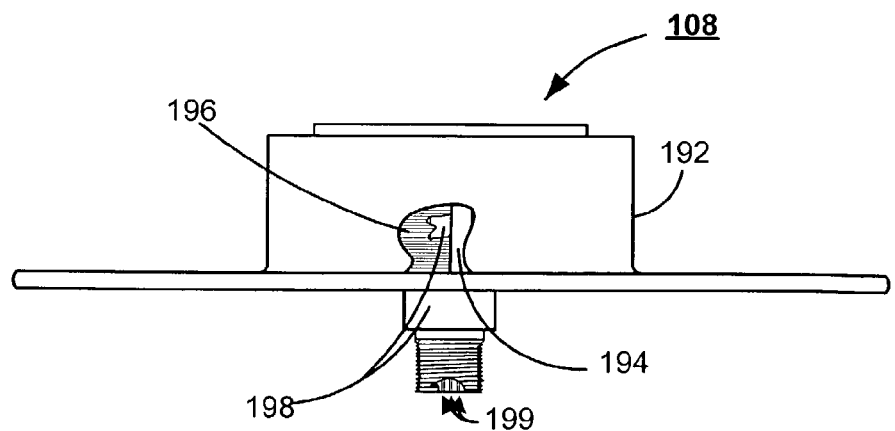
FIG. 5 is a partial cut-away elevational view of the motor of FIG. 3.

The motor 108 shown by FIG. 5 includes a rotor hub 192 (also referred to as rotor 192) supporting a plurality of permanent magnets (one shown at 194). The permanent magnets 194 are adjacent motor windings 196 (i.e., A, B and C phase windings 178, 180 and 182 (of FIG. 4) supported by a stator shaft 198.

The stator shaft 198 confines motor contacts 199, which selectively pass current through elected pairs of phase windings 178, 180 and 182 for locating the rotor and operating the motor 108. In a preferred embodiment, the determination of which commutation state of an electrical revolution the rotor 192 resides is used to determine a substantially accurate position of the rotor within the determined commutation state. Based on the position of the rotor within the determined commutation state, a travel distance for advancement of the rotor 192 to a position adjacent a first commutation point of a next commutation state of the electrical revolution is determined.

Figure 6:
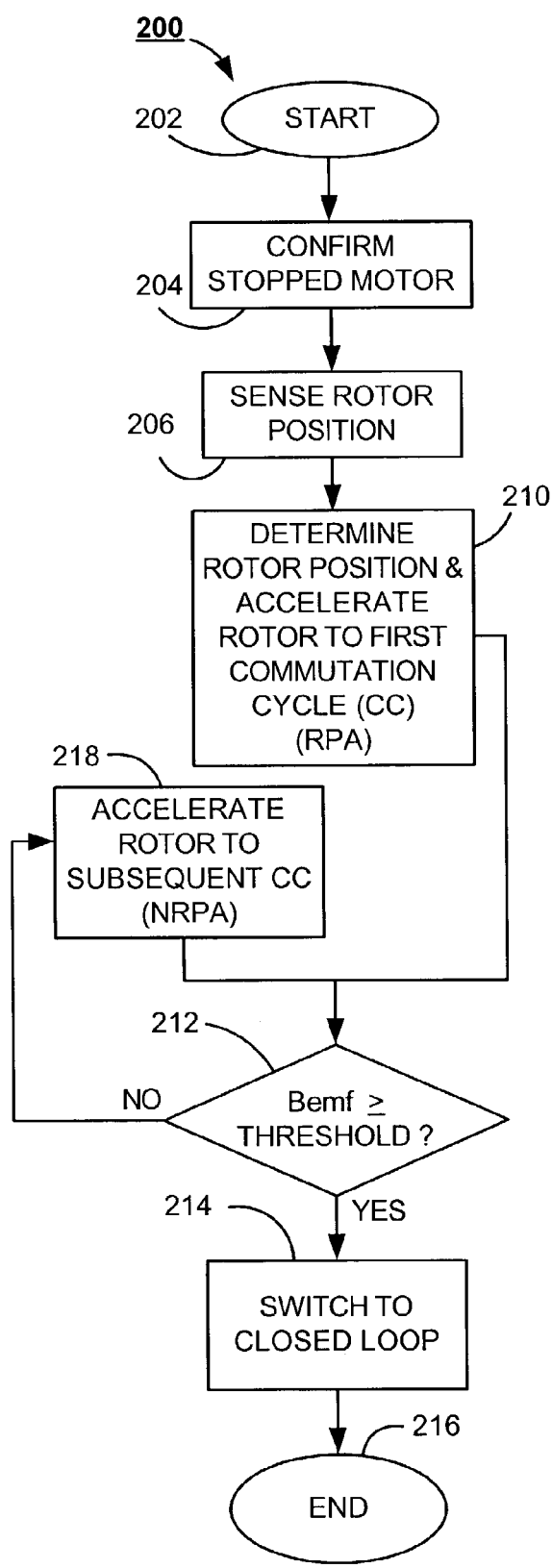
FIG. 6 is a flow chart of the motor control code of FIG. 2.

FIG. 6 shows a motor start process sequence 200 to start the motor 108. The motor start process sequence 200 commences at start process step 202 and continues at process step 204 by confirming the motor is stopped. At process step 206, the location of the rotor 192 is sensed through use of a Rotor Position Sense Routine (RPS). Execution of RPS commences upon confirmation that the motor is stopped, and a spin-up command is received by the servo processor 144 from the control processor 134.

As discussed in greater detail below during the discussion of FIG. 11, RPS determines in which commutation state the rotor resides while the motor is in the stopped position (i.e., at rest). For three-phase motors, there are six commutation states within each electrical revolution. Each state spans 60 (360/6) electrical degrees. Advancement of the rotor through a commutation state constitutes a commutation cycle. Advancement through all six commutation states constitutes an electrical revolution.

Figure 10:
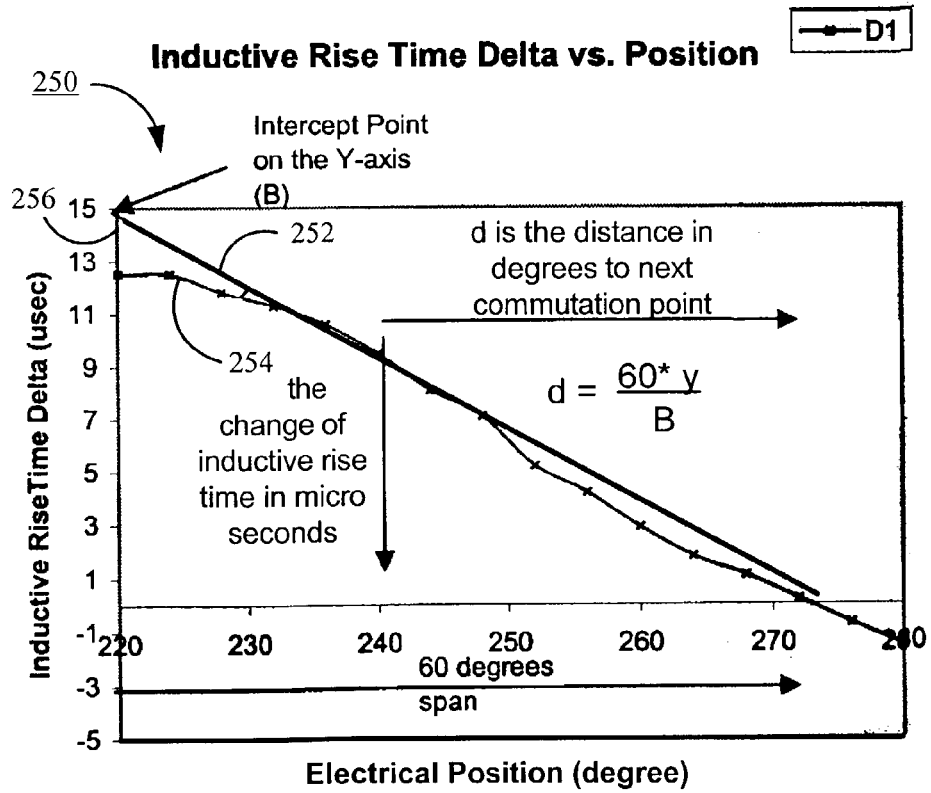
FIG. 10 is a diagram of a position of a rotor within a commutation state of the motor of FIG. 5.

After determining in which commutation state the rotor resides, the motor start process sequence 200 continues at process step 210 with a determination of a travel distance for the rotor to progress for alignment with a first commutation point of the next commutation state (a distance determination technique will be covered in greater detail during discussion of FIG. 10). Process step 210 also determines an appropriate amount of activation time of the driver 152 to accelerate the rotor into alignment with the first commutation point. In a preferred embodiment, activated time is determined by a Rotor Position Acceleration Routine (RPA) (covered in greater detail during the discussion of FIG. 12).

RPA employs a processor (such as ARM 146) working in tandem with the spindle driver. The processor searches for the commutation points during the durations of inactivity of the spindle driver. In a preferred embodiment, when the motor speed reaches a certain rpm (revolution per minute) range (for example, about 500–800 rpm), sufficient Bemf (Back Electro Motive Force) is generated to allow the driver to commutate without the help from the processor. Commutation without the aid of the processor is referred to as; "closed loop" operation of the motor.

At process step 212, a determination of whether sufficient Bemf has been generated to meet a predetermined Bemf threshold is made. The Bemf threshold is determined during the design phase of the data storage device. If sufficient Bemf has been generated, the process advances to process step 214 and rotational control of the motor is switched to the closed loop operating mode. Upon attainment of closed loop operation, the process concludes at end process step 216. However, if sufficient Bemf has not been generated, the process proceeds to process step 218.

Figures 12, 13:
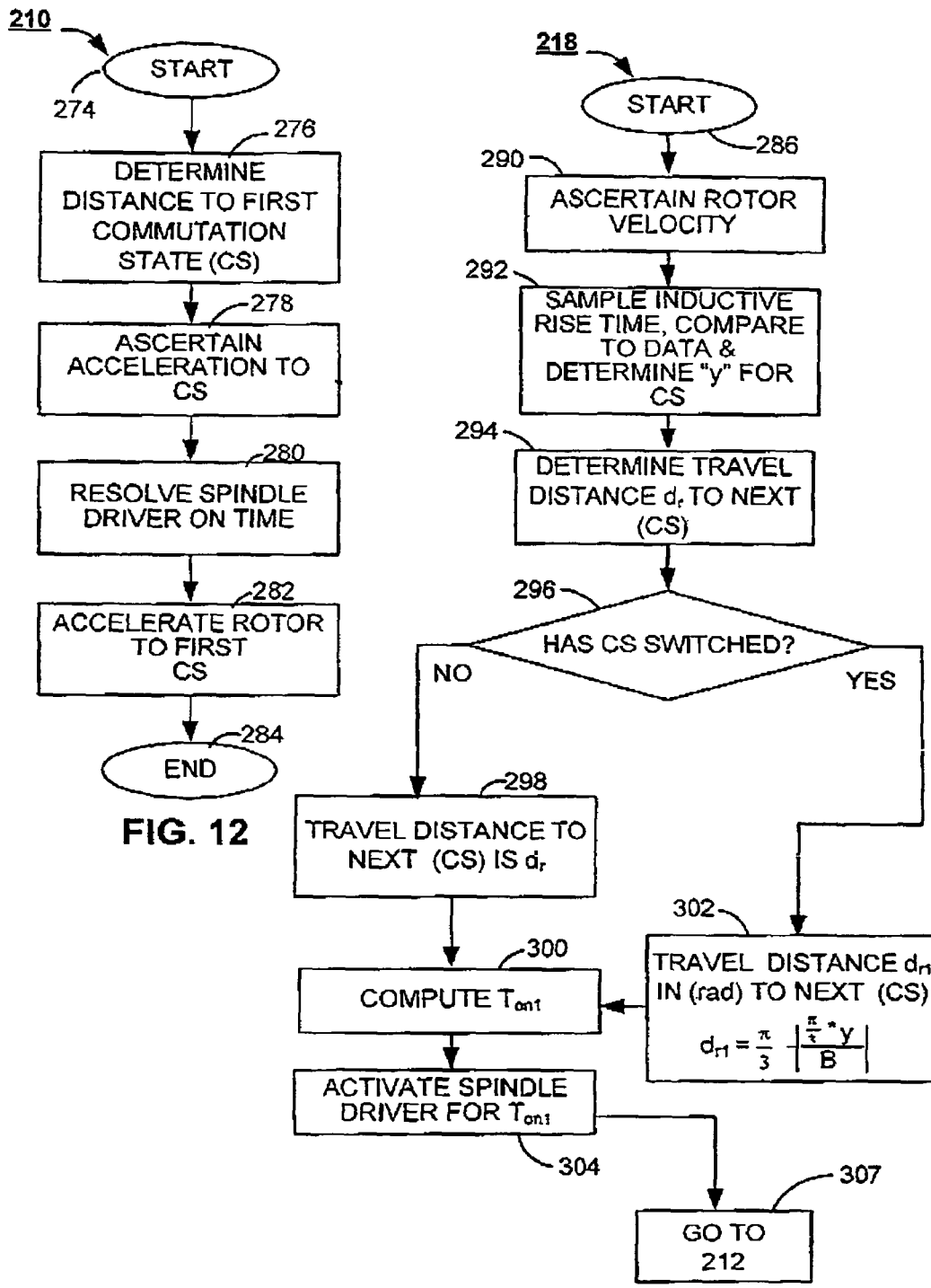
FIG. 12 is a flow chart of a method of accelerating a stopped rotor of the motor of FIG. 5.
FIG. 13 is a flow chart of a method for accelerating a rotating rotor of the motor of FIG. 5.

At process step 218, the driver is activated by a "Newtonian Rotor Position Acceleration Algorithm" (NRPA) (NRPA operational details are covered during the discussion of FIG. 13). NRPA incorporates a mathematical formula, which uses an acceleration and initial speed of the rotor to compute the "On-Time" activation of the driver to maximize output torque of the motor.

As will be recognized, acceleration of a motor is a function of input torque, inertia, and friction. Torque (oz*inch) is a function of input electrical current (in Amperes). Inertia (oz*inch*sec^2) is dependent on a particular data storage device of interest, which is determined during the design phase of the device.

The motor start process sequence 200 continues to loop through process steps 212 and 218 until sufficient Bemf is generated to support closed loop operation of the motor. Upon achieving sufficient Bemf, the process progresses to process step 214, which switches control of the motor to the closed loop operating mode. The process concludes at end process step 216.

In a preferred embodiment, an inductive rise time (RT) is a function of the inductance and resistance between the two active phase windings, indicative of a response of two of the three phase windings 178, 180 and 182, of the motor 108, to an injection of electrical current for a predetermined time across a selected pair of the three phase windings. RT is defined as a time taken for a pulse to develop following injection of electrical current through selected windings. The direction of the input current is important because the rise-time may have a different quantitative measure if the direction of the input current is reversed.

Because the function of the rotor 192 affects the total effective inductance, RT is also a function of the position of the rotor 192 relative to the phase windings 178, 180 and 182 and is useful in determining both location and position of the rotor 192, i.e., determining in which one of the 60 electrical degree commutation states the rotor is located, and where within that commutation state (to within substantially a couple of electrical degrees) is the rotor positioned.

RT exhibits an approximate LINEAR function with respect to the rotor's position within the commutation state. This approximate linear relationship between the RT and the position of the rotor 192, relative to the next commutation point the rotor will encounter during rotation, is used to calculate the substantially accurate position for the rotor 192. Accuracy of the position of the rotor 192 within its determined commutation state depends on a measurement resolution of the RT measurement and characteristics of the rotor.

Figure 7:
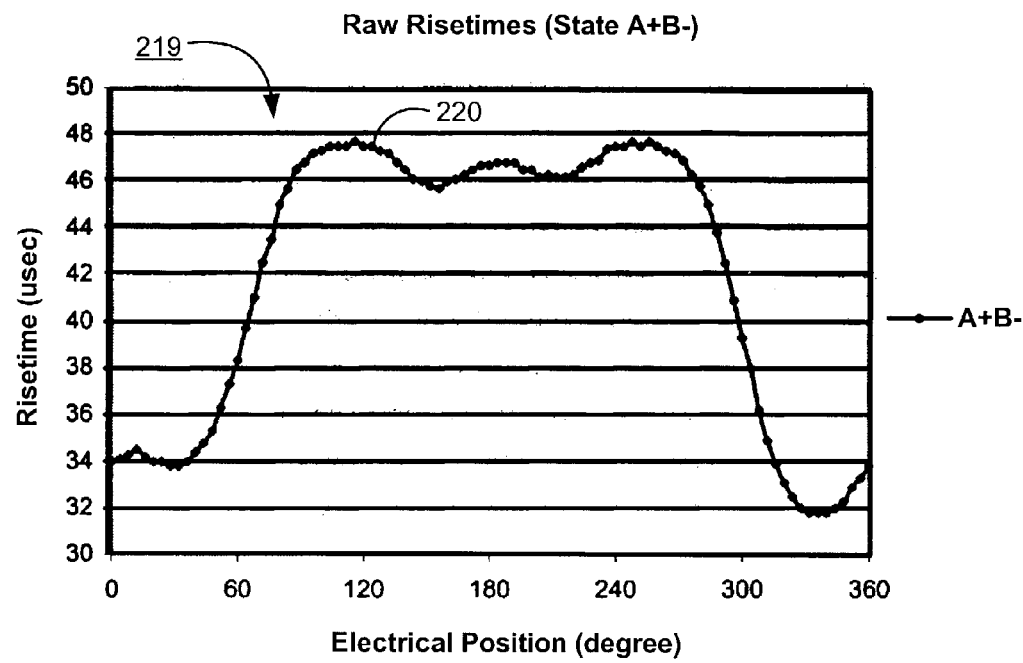
FIG. 7 is diagram of an inductive rise time plot characterizing a response by pair of windings' of the motor of FIG. 4 responding to an applied current.

FIG. 7 shows a plot 219 of a raw RT curve 220 reflective of an indicative response of a selected pair of the three phase windings (such as 178, 180 and 182 of FIG. 4), to an application of a measurement current across two current entry points of the selected pair of windings (such as A, B and C of the phase windings 178, 180 and 182 (of FIG. 4).

For purposes of enhancing an understanding of the present invention, and absent an imposition of limitations on the present invention, the raw RT measurement plot of FIG. 7 may be viewed as a rise time of a pulse resulting from a measurement current flowing through phase windings 178 and 180 for a predetermined period of time.

Referring back to FIG. 4, entry of the measurement current is at current entry point A of phase winding 178 and moves toward current entry point B of phase winding 180. The measurement current is controlled at a level sufficient to develop the pulse within the predetermined period of time, but insufficient to advance rotation of the rotor. Movement of the measurement current from entry point A, through phase windings 178 and 180 to entry point B defines movement of the measurement current through commutation state (A+B−).

RT of a single commutation state is insufficient to describe the location of the rotor 192 within the electrical revolution, i.e., in which commutation state the rotor 192 resides. In a preferred embodiment, six commutation states (A+B− and A−B+, B+C− and B−C+, C+A− and C−A+) of a three phase motor are used to determine in which commutation state of the electrical revolution the rotor 192 resides.

Figure 8:
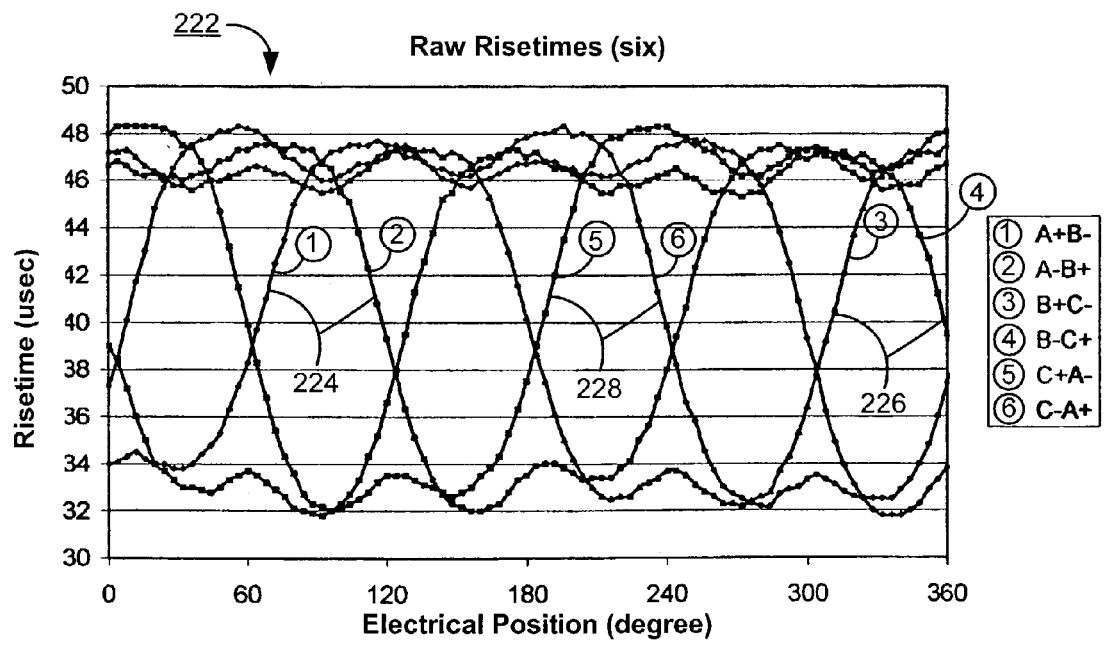
FIG. 8 is diagram of inductive rise time plots characterizing a response by each pair of windings' of the motor of FIG. 4 responding to an applied current.

FIG. 8 shows a composite plot 222 of all six raw RTs of a 3-phase motor. The six raw RTs, or three pairs of raw RT plots, are shown as: A+B− (1) and A−B+ (2) (pair 1, 224); B+C− (3) and B−C+ (4) (pair 2, 226); and C+A− (5) and C−A+ (6) (pair 3, 228).

The direction of the injected measurement current is important because of its affect on the total effective inductance across the windings. For example, the RT plot A+B− (1) shows the result of injecting the measurement current at current entry point A, of phase winding 178, and exiting through current entry point B, of phase winding 180. Whereas the RT plot A−B+ (2) shows the result of injecting the measurement current at current entry point B, of phase winding 180, and exiting through current entry point A, of phase winding 178.

Figure 9:
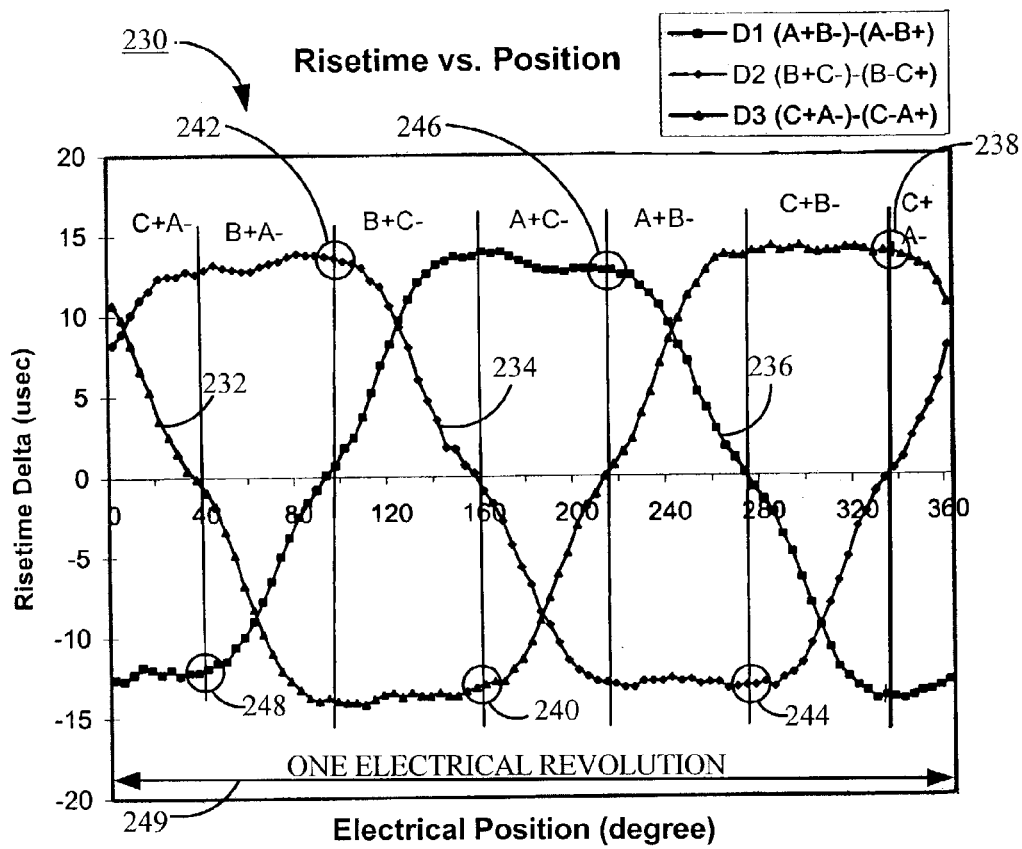
FIG. 9 is a diagram characterizing a difference between inductive rise times for each winding pair of the motor of FIG. 4 responding to applied current at different polarity.

For a three phase motor embodiment, when all six RTs are obtained, from which three RT delta curve plots are computed. Each RT delta curve plot results from a combination of two opposite pair of raw RT plots (plots of a common pair of windings reflective of currents of opposite polarity flowing through the winding pair), such as a resultant plot formed from a difference between pair 1, 224, i.e., the difference between RT (A+B−) and RT (A−B+). FIG. 9 shows a Rise Time Deltas vs. rotor's position plot 230 for each of the RT pairs 224, 226 and 228.

$$D1 = [\text{inductive rise time } (A+B-)] - [\text{inductive rise time } (A-B+)] \quad (3)$$

$$D2 = [\text{inductive rise time } (B+C-)] - [\text{inductive rise time } (B-C+)] \quad (4)$$

$$D3 = [\text{inductive rise time } (C+A-)] - [\text{inductive rise time } (C-A+)] \quad (5)$$

By viewing FIG. 9, it can be readily seen that each zero crossing point of each of the RT delta curves 232, 234 and 236 defines a boundary of a commutation state and thereby a commutation point. A trailing edge of a first commutation state coexists with a leading edge the next commutation state. By determining which RT delta curve incurred a zero crossing, i.e. a change in sign, at the trailing edge of a commutation state, the windings involved with the progression of the rotor through that the commutation state are confirmed. By analyzing the slope of the RT delta curve of the involved windings, the direction of the current flow through the involved windings is known.

Knowledge of which commutation state a stopped rotor resides provides knowledge of which commutation state will be next encountered, i.e., which pair of windings will next be involved with the advancement of the rotor. The direction of current flow through the pair of windings for the commutation state of the stopped rotor 192 provides knowledge for initiating rotation of the rotor as well as the appropriate direction of current flow through the next pair of windings involved in the rotation of the rotor 192.

The RT delta curves D3 (232), D2 (234), and D1 (236) are used to form a "Rotor Position as A Function of Inductive Rise Times" (Table 2), which is useful in determining which commutation state the rotor 192 is initially located. Table 2, Rotor Position as A Function of Inductive Rise Times, describes how a commutation state is chosen based on the Delta plots 230 and the correspondent parameter used to calculate the rotor position.

TABLE 2

| D1 = (A + B-) - (A - B+) | D2 = (B + C-) - (B - C+) | D3 = (C + A-) - (C - A+) | Commutation State | Parameter Used To Determine The Rotor's Position |
|---|---|---|---|---|
| − | + | + | C + A− | D3 (238 FIG. 9) |
| −/+ | + | +/− | B + A− | −D1 (248 FIG. 9) |
| + | +/− | − | B + C− | D2 (242 FIG. 9) |
| +/− | − | −/+ | A + C− | −D3 (240 FIG. 9) |
| + | − | +/− | A + B− | D1 (246 FIG. 9) |
| +/− | − | + | C + B− | −D2 (244 FIG. 9) |

FIG. 9 and table 2 shows that, for commutation state (C+A−), RT delta curve D3 switches signs at the boundary of commutation states (C+A−) and (B+A−). This defines windings 182 and 178 (of FIG. 4) as the operative windings for commutation state (C+A−). Because D3 has a positive value across the commutation state, the parameter used to determine the position of the rotor is the value associated with the positive D3 at the commutation point of the operative commutation state, i.e., 238 of FIG. 9.

As can readily be seen, Table 2 is useful in determining in which state the rotor 192 resides. If the rotor resides in commutation state C+A−, D1 will be negative, D2 will be positive and D3 will be positive. If the rotor resides in commutation state B+A−, D1 will be negative, D2 will be positive and D3 will be negative, and so on.

Table 2 is also useful during acceleration of the rotor 192. To accelerate the rotor 192, a drive current is applied for a period of time across the pair of windings appropriate for advancement of the rotor 192 from a stopped position. Following the application of the drive current, the rotor 192 is placed in a coast mode to determine if a change in state is needed. During this period of coasting, RT measurements are made and used for determination of the rotor position.

As an aid to an enhanced understanding of the procedure for ascertaining a position within a commutation state that the rotor 192 resides, FIG. 10 shows a plot 250 of an RT delta curve as a function of the commutation state in which the stopped rotor 192 resides (this is referred to herein as the first commutation state). FIG. 10 shows a commutation state spans 60 electrical degrees (or $$\frac{\pi}{3}$$

radians) of one electrical rotation.

Modeling an RT delta curve is useful in determining a position within the commutation state that a stopped rotor resides. A model of an ideal RT delta curve as a function of a commutation state that a rotor (such as 192) resides may be expressed as either a linear approximation or as polynomial approximation of the behavior of operative RT delta curve across the commutation state.

In a preferred embodiment, the model is a linearization of the operative RT delta curve of the commutation state of interest. Ideal RT delta curve 252 represents an ideal RT delta curve generated by the model modeling the actual RT delta curve 254. Determination of the position of the rotor 192, relative to a next commutation point, incorporates the RT delta curves D1, D2 and D3 (of FIG. 9) in conjunction with a model or ideal RT delta curve associated with each of the RT delta curves D1, D2 and D3, which are referred to as D1I, D2I and D3I.

With reference to FIG. 10, an intercept of the time axis by the operative ideal RT delta curve (D1I, D2I or D3I) at a leading edge of the commutation state (in which the stopped rotor 192 resides) is determined and set as an intercept point "B" (such as 256). Intercept point B establishes a maximum RT value for the operative RT delta curve.

Using Table 2, a correct input (either ±D1, ±D2, or ±D3) is selected to determine "d", the distance in degrees from the current position to the next commutation point. That is, Table 2 is referenced to determine in which commutation state the stopped rotor 192 resides, from which the appropriate RT delta curve is deduced. Determination of the distance "d" is preferably based on the following equation:

$$d = \frac{60 * y}{B} \qquad (6)$$

y=The change of the inductive RT (in micro seconds).
B=The maximum of the change of the inductive RT (in micro seconds).
d=The distance in electrical degrees to the next commutation point.

Preferably, with identification of the correct RT delta curve, an ideal RT delta curve is determined as a linear approximation of the correct RT delta curve, and a value for "B" is identified. A value for "y" is the actual value of the intercept of the inductive RT delta axis at the leading edge of the commutation state of interest. Exemplary values are 238, 240, 242, 244, 246 or 248 (of FIG. 9).

In a preferred embodiment, an activation time is next determined to move the rotor to a second position comprising a selected commutation point in the next (second) commutation state. This activation time is referred to as "Motor On Time" ($T_{on}$) and is preferably calculated to extract substantially a maximum torque from the motor 108 while advancing the rotor 192 (of FIG. 5) to the second position. The time $T_{on}$ is determined in accordance with the following terms:

α≡Acceleration(radian/sec)$^2$
J≡Inertia(oz*inch*sec$^{\wedge}2$)
$d_r$≡Distanceoftravel (radian)

$$Kt \equiv MotorTorqueConstant\left(\frac{oz * in}{Amp}\right)$$

Irms=AverageMotorCurrent(Amp)
$T_{friction}$=FrictionTorque(oz*in)
$T_{load}$=LoadTorque(oz*in)
$T^{good}$=Torque doing work(oz*in)
$T_{on}$=MotorOnTime(sec)
Motor acceleration is the ratio of the good torque to inertia.

$$T_{good}=K_t*I_{rms}-T_{load}-T_{friction} \; (oz*in) \tag{7}$$

$$\alpha = \frac{T_{good}}{J}\left(\frac{rad}{sec^2}\right) \tag{8}$$

At an initial velocity of zero, the distance of travel equation (6) is simply:

$$d_r = \frac{1}{2}\alpha t^2 \tag{9}$$

Motor Driver On Time ($T_{on}$) is the solution t of the distance of travel equation (9), which is:

$$T_{on} = t = \sqrt{\frac{2d_r}{\alpha}} \tag{10}$$

Ideally, turning the driver 152 on for duration $T_{on}$ drives the motor 108 to advance the rotor 192 to the next commutation point, and utilizes substantially all available motor torque. It will be noted that applying a drive current to the motor windings for the duration of $T_{on}$ will result in the rotor accelerating. The motor is then placed in a coast mode to facilitate measurement of the inductive rise time (RT) as described hereinabove.

Due to the tolerances of the mechanical and electrical parameters (inertia, friction, load), and imperfection of the math calculations (rounding errors, etc.), it is possible that the rotor 192 will not land exactly on the desired commutation point of the next commutation state. To assure the rotor 192 has been properly advanced, the commutation points are preferably checked while the rotor is coasting by looking for the change of the sign of the operative RT delta curve (as shown in Table 2 and FIG. 9).

In accordance with preferred embodiments, at a start of a new commutation state, the ideal travel distance will be approximately equal to $$\frac{\pi}{3}$$

(a full commutation period for a three-phase motor). However, the rotor 192 may have progressed beyond the commutation point of the next commutation state. As such, the actual travel distance ($d_r$) is calculated as:

$$d_r = \frac{\pi}{3} - \left|\frac{60*y}{B}\right|(rad), \tag{11a}$$

which may be alternatively expressed in a general form as:

$$d_r = \frac{\pi}{x} - \left|\frac{\frac{\pi}{x}*y}{B}\right|, \tag{11b}$$

In which "x" is one half (½) the number of total commutation states within the electrical revolution.

That is, the ideal travel distance offset by the actual travel distance expressed in radians. If it is still not time to advance to the next state, i.e. the rotor 192 has not quite progressed to the commutation point of the next commutation state, the travel distance is described as:

$$d_r = \frac{60*y}{B}, \tag{12a}$$

which may be alternatively expressed in a general form as:

$$d_r = \frac{\frac{\pi}{x}*y}{B}(rad) \tag{12b}$$

In a preferred embodiment, determination of $T_{on}$ for the very first commutation cycle, equation (10) is utilized, and the acceleration component of equation (10) is calculated based on input torque and inertia:

$$\alpha = \frac{T_{good}}{J}\left(\frac{rad}{sec^2}\right). \tag{13}$$

In an alternate preferred embodiment, acceleration is determined at the end of every commutation state based on the distance moved by the rotor 192. The moving distance, $\Delta d$, is the difference between the locations before and after the rotor 192 is advanced, ie:

$$\Delta d = d(T_{on}) - d(T_0) \; (rad) \tag{14}$$

Which may be expressed as:

$$\Delta d = \omega_0 T_{on} + \frac{1}{2}\alpha T_{on}^2; \; (rad) \tag{15}$$

Solving for acceleration ($\alpha$), equation (15) is expressed as:

$$\alpha = \frac{2(\Delta d - \omega_0 T_{on})}{T_{on}^2}\left(\frac{rad}{sec^2}\right) \tag{16}$$

A stopped motor starts with zero initial velocity. After the very first commutation cycle, the initial velocity will be non-zero. An equation to calculate velocity for a constant acceleration is, $$\omega(T_{on})=\omega_0+\alpha*T_{on} \tag{17}$$

It should be noted that the speed at the end of the first commutation state ($\omega(T_{on1})$), is equal to the initial speed for the next commutation state. In a preferred embodiment, $T_{on(x)}$ for a subsequent commutation state, is based on $T_{on(x-1)}$ of the just proceeding commutation state. $T_{on(x)}$ is determined through use of an equation describing a non-zero initial velocity with acceleration such as:

$$d_r = \omega_0 t + \tfrac{1}{2}\alpha t^2 \text{ (rad)} \tag{18}$$

Once the rotor moves, it will pick up some speed. Acceleration ($\alpha$) is determined by equation 16, travel distance ($d_r$) of the rotor 192 to the next commutation point is determined by equation 12b, and $T_{on(x)}$ is the solution t for equation (18).

Re-arrangement of equation 18 shows that:

$$t^2 + 2\omega_0/\alpha + 2d_r/\alpha = 0 \tag{19}$$

and solving for t, $$T_{on(x)} = t = -\frac{\omega_0}{\alpha} + \sqrt{\left(\frac{\omega_0}{\alpha}\right)^2 + \frac{2d_r}{\alpha}} \text{ ; (sec)} \tag{20}$$

Figure 11:
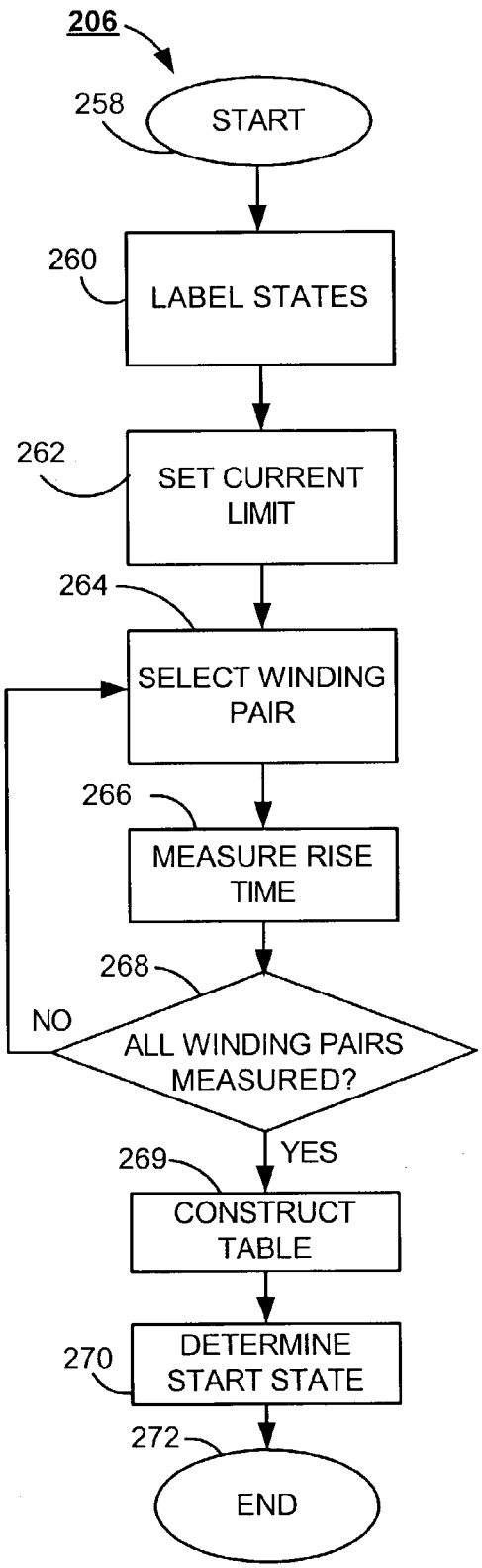
FIG. 11 is a flow chart of a method for determining a start state of a rotor of the motor of FIG. 4.

FIG. 11 provides a flow chart for a rotor sense position routine 206 (such as called for by step 206 of FIG. 6), illustrative of steps carried out by the data storage device 100 in accordance with preferred embodiments of the present invention to determine in which commutation state the rotor 192 resides, in preparation for accelerating the motor from a stopped position.

Rotor sense position routine 206 commences with start step 258 and continues with step 260 by labeling the commutation states corresponding to an electrical revolution (such as 249 of FIG. 9). Labeling of the commutation states is preferably achieved through operation of on board firmware executed by the top level processor 134.

At process step 262, measurement current limits are selected. An upper limit for the measurement current is selected at a level slightly below a saturation level. The electrical pulse develops as a result of passing the measurement current through a selected pair of windings. During RT measurements of the electrical pulse, a timer of the top level processor is used to monitor progress of the RT measurements. A predetermined time limit for the pulse to develop is set and monitored by the timer. A lower limit for control of the measurement current is set sufficient to achieve development of the electrical pulse within the predetermined time limit.

At process step 264, a first labeled commutation state (such as C+A−) is selected and the measurement current is applied across a pair of windings (such as 182 and 178) associated with the selected commutation state. The measurement current is injected into the first of the pair of selected windings at a current entry point (such as C) of the first of the pair of selected windings.

The measurement current progresses through the pair of windings, and exits the windings at a current entry point (such as A) of the second winding of the pair of windings. Passage of the measurement current through the windings develops the electrical pulse. An RT of the electrical pulse is measured at process step 266 and the RT measurement data are stored. Results of the measurement data are used to provide a raw RT plot (such as 219).

Decision step 268 determines whether all winding pairs have been measured. If not, the routine returns to step 264 where the next pair of windings is selected. Once measurements have been obtained for all winding pairs, the flow continues from step 268 to step 269 where a table is constructed that identifies rotor position as a function of inductive rise times (such as exemplified by Table 2 discussed above). The routine then determines a start state (i.e., the commutation state with which the rotor 192 is initially aligned) at step 270 through reference to the table (such as Table 2), and the process ends at step 272.

FIG. 12 provides a flow chart for rotor position acceleration routine (RPA) 210, previously discussed above with reference to FIG. 6. FIG. 12 is illustrative of steps carried out by the device 100 in accordance with preferred embodiments of the present invention to accelerate the rotor 192.

RPA process 210 commences at start step 274 and continues to process step 276, which operates to identify the first position of the rotor within the commutation state with which the rotor 192 is initially aligned. This is carried out using an RT model such as discussed in FIG. 10 and shown in FIG. 6. RPA process 210 commences at start step 274 and continues to process step 276, which determines a distance "d" by application of a distance formula (such as equation 6). In other words, step 276 further operates to identify the travel distance "d" to move the rotor 192 from the first position to the second position (i.e., a selected commutation point in the second commutation state, CS).

Preferably, the selected commutation point in the second commutation state corresponds to the beginning of the second commutation state. Hence, the travel distance "d" will indicate substantially the number of degrees between the first position and the next commutation state, thereby serving to indicate the initial position of the rotor.

For example, with reference again to FIG. 10, if the rotor is located about 45 degrees into a selected 60 degree commutation state span, a value d1 will be calculated to be about 15 degrees during step 276. This means that the initial position of the rotor within the first commutation state is 15 degrees from the end of the first commutation state (moving right to left in FIG. 10), or 60−15=45 degrees from the beginning of the first commutation state (moving left to right in FIG. 10).

Continuing with the flow of FIG. 12 an acceleration of the rotor to attain the first commutation point is ascertained at step 278 by application of an acceleration formula (such as set forth by equation 8). At process step 280, an amount of activation time for the driver 152 to accelerate the rotor 192 to the selected commutation point is resolved through an application of a distance to travel formula (such as equation 9), and a driver time on ($T_{on}$) formula (such as equation 10). At process step 282, the driver is activated for a period of $T_{on}$ to accelerate the rotor to the first commutation point and the RPA process 210 concludes at end process step 284.

Once the rotor has accelerated to substantially the first commutation point, a process for accelerating the rotor to subsequent commutation point is applied. Such a process is illustrated by a Newtonian Rotor Position Acceleration Routine (NRPA) 218 flow chart of FIG. 13.

The NRPA process 218 commences at start step 286.

A velocity of the rotor at the first commutation point is determined by a velocity formula (such as equation 17) at process step 290. Also at process step 290, a substantially maximum available acceleration of the rotor by the motor to advance the rotor to a next or subsequent commutation point is ascertained by application of an acceleration formula (such as equation 18).

RTs of windings (such as 178 and 180) operative in the acceleration of the rotor are sampled. A RT delta curve value "$y_1$", i.e., the then instant, RT delta curve value "y", is determined from the sampled RTs at process step 292. At process step 294, travel distance, $d_r$, to the next subsequent commutation point is determined through use of a distance formula (such as equation 12b). At process step 296, the RT delta curve value "$y_1$" is checked for a change in sign, i.e., whether a switch in commutation states has taken place. If a switch in commutation states has not taken place, the process continues with process step 298 by passing on the travel distance $d_r$, determined by process step 294 to process step 300.

At process step 300, an on time, such as ($T_{on1}$), is computed for a driver (such as 152) through an application of a driver time on formula (such as equation 20). This leg of the process is used when the acceleration of the rotor at process step 210 (FIG. 6) does not sufficiently advance the rotor to the next commutation point. However, if a switch in commutation states has been determined at process step 296, the NRPA process 218 advances to process step 302.

At process step 302, the travel distance, $d_{r1}$, is determined by a distance formula (such as equation 11b). The NRPA process 218 progresses to process step 300 to determine the driver time on ($T_{on1}$). This leg of the process is used when the acceleration of the rotor at process step 210 (FIG. 6) sufficiently advances the rotor to the next commutation point, or slightly beyond.

At process step 304, the driver is activated for an activation time of $T_{on1}$ and the control returns in block 307 to block 212 of FIG. 6.

However, if the Bemf threshold has not been attained, the NRPA process 218 reverts to process step 290 and loops through the process until the Bemf threshold has been attained. When the Bemf threshold is attained, control of the motor is switched to the closed loop operating mode of process step 308. Once the rotor is operating in the closed loop mode, acceleration of the rotor continues until operating velocity of the rotor is reached. Upon attaining operating velocity, the closed loop mode maintains the rotor at substantially the operating velocity.

In a preferred embodiment, utilization of available torque of the motor assembly 108 is greatly enhanced by determining both a location of the rotor 192 within a commutation state (such as C+A−) of an electrical revolution (such as 249), as well as a substantially accurate position (such a 238) of the rotor within that commutation state.

Figure 14:
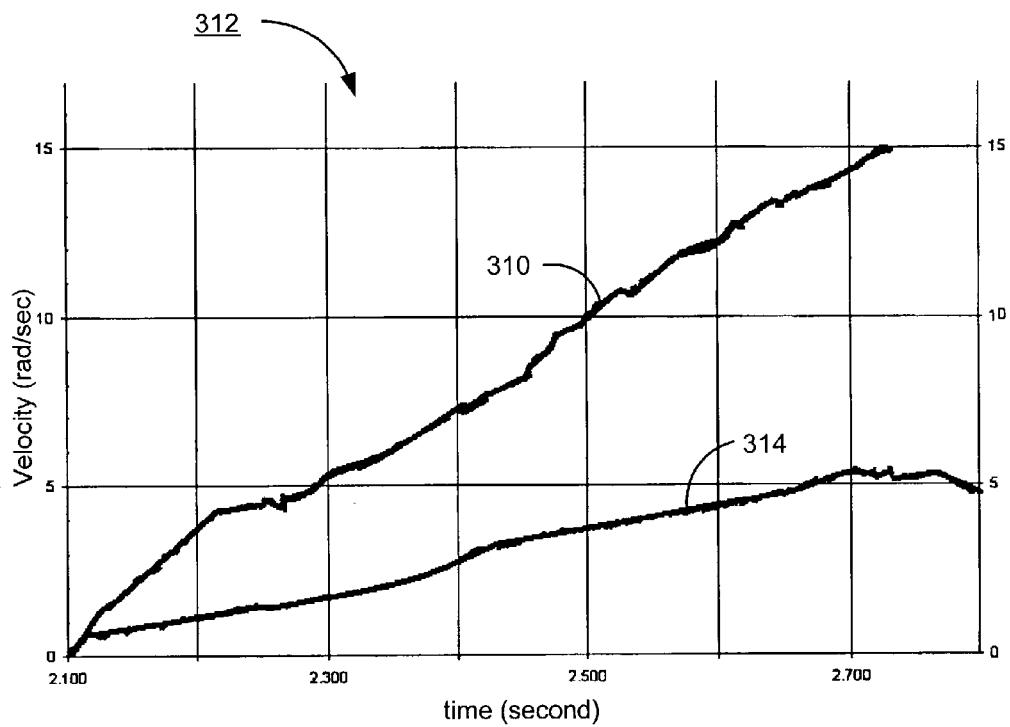
FIG. 14 is a diagram of an acceleration comparison of alternate, rotor acceleration methods for accelerating the rotor of the motor of FIG. 5.

As shown by acceleration curve 310 of the acceleration comparison plot 312 of FIG. 14, the routine accelerates the rotor nearly three times as fast as acceleration of the same motor utilizing a FTM start-up method, as shown by acceleration curve 314.

Figure 15:
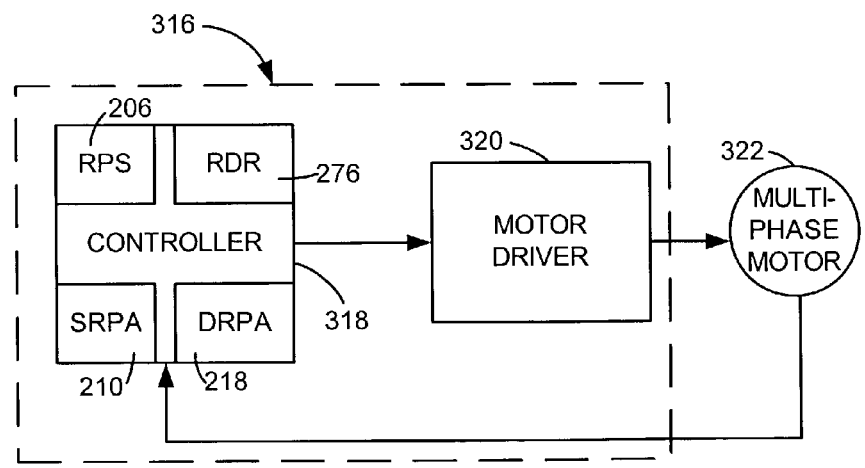
FIG. 15 is a functional block diagram of an acceleration control system controlling a multi-phase motor.

While preferred embodiments discussed above have basically been directed to the acceleration of a motor in the environment of a data storage device, it will be readily understood that such is not limiting to the scope of the claimed invention. FIG. 15 shows a generalized functional block diagram of a preferred embodiment of an acceleration control system 316, incorporating a controller 318 controlling a motor driver 320 for use in controlling an acceleration of a multi-phase motor 322. The acceleration control system 316 can be utilized in any number of applications (commercial, industrial, oil field, etc.) in which a multi-phase motor is rotated.

The controller 318 executes a position sense routine (such as 206), programmed into the controller 318, to determine a substantially accurate position (about 1 or 2 electrical degrees) of a rotor of the multi-phase motor within a first commutation state. The substantially accurate position of the rotor is based on values obtained through application of a measurement current across a pair of windings of the multi-phase motor 322. The measurement current is selected at a level below a saturation current level for the multi-phase motor 322.

By manipulating the obtained values with a rotor distance determination routine (such as 276), programmed into the controller 318, the controller 318 determines a rotational travel distance for advancement of the rotor to a first commutation point of a second commutation state. Based on the determined travel distance, and static characteristics of the multi-phase motor 322, the controller 318 further executes a static rotor position acceleration routine (such as 210), programmed into the controller 318. Execution of the static rotor position acceleration routine by the controller 318, determines a first, substantially optimized activation time for the motor driver 320. Driving the multi-phase motor for the substantially optimized activation time, the multi-phase motor accelerates the rotor from a static state to the first commutation point of the second commutation state, utilizing substantially all available motor torque.

Once under way, the controller 318 executes a dynamic rotor position acceleration routine (such as 218), programmed into the controller 318, for determination of a second, substantially optimized activation time for the motor driver 320. In response to activation of the motor driver for the second, substantially optimized activation time, the multi-phase motor accelerates the rotor a second commutation point of a third commutation state, while utilizing substantially all available motor torque.

Determination of the second, substantially optimized acceleration time for activation of the motor driver is based on the rotational travel distance to be covered by the rotor, velocity of the rotor, and characteristics of the multi-phase motor 322 operating in a dynamic environment.

The controller 318 continues execution of the dynamic rotor acceleration routine for determination of subsequent activation times for the motor driver 320 for utilization of substantially all motor torque available for accelerating the rotor operating in a dynamic environment.

Accordingly, embodiments of the present invention are in the main directed to a method (such as 200) and apparatus (such as 316) for accelerating a rotor (such as 192). A substantially accurate position of a stopped rotor of a multi-phase motor (such as 108) is determined by activating a rotor position sense routine (such as 206) programmed into a controller (such as 318).

Applying an on board static rotor position acceleration routine (such as 210), the controller directs an acceleration of the rotor from a stopped position to a first commutation point (such as 242) utilizing substantially all available torque of the multi-phase motor.

Executing repetitively a dynamic rotor position acceleration routine (such 218) resident in the controller, the controller induces acceleration of the rotor, using substantially all available torque of the multi-phase motor, to a velocity sufficient to allow closed loop control of the multi-phase motor.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the appended claims.

For example, the present invention may be applied to non data storage devices environments, such as for motors utilized in down-hole applications, sump pump applications, conveyor system or for any application utilizing multi-phase motor.

What is claimed is:

1. A method comprising:
   modeling a response of a selected pair of motor windings to a sense pulse to determine a first position of a rotor within a first commutation state;
   deriving an optimized drive pulse activation time used to accelerate the rotor across a first travel distance from the first position to a second position while utilizing substantially all available torque; and
   applying a first drive pulse to the motor for the optimized drive pulse activation time to accelerate the rotor to the second position.

2. The method of claim 1, in which the first commutation state is identified by step comprises sequentially applying sense pulses to windings of the motor and measuring a corresponding rise time for a resulting voltage developed across the windings by application of each said sense pulse, said rise time determined in relation to impedance of the windings determined, in turn, by the electrical rotational position of the rotor.

3. The method of claim 2, in which the sense pulses comprise current pulses selected to be at a level sufficient to induce a voltage rise across the windings within a predetermined time, and insufficient to advance rotation of the rotor.

4. The method of claim 1, wherein the drive pulse activation time ($T_{on}$) is derived in accordance with the relation:

$$T_{on} = \sqrt{\frac{2d_r}{\alpha}}$$

where $d_r$ is the travel distance, and $\alpha$ is a maximum acceleration the motor can deliver based on a torque constant of the motor, a total load placed on the motor, and an amount of inertia associated with the motor together with the total load placed on the motor.

5. The method of claim 1, further comprising:
   obtaining a second travel distance for continued acceleration of the rotor from the second position to a third position;
   deriving a second optimized drive pulse activation time to continue acceleration of the rotor from the second position to the third position utilizing substantially all available torque; and
   applying a second drive pulse to the motor for the second optimized drive pulse activation time to advance the rotor to the third position.

6. The method of claim 5, in which the second optimized drive pulse activation time is derived in accordance with the relation:

$$T_{on} = t = -\frac{\omega_0}{\alpha} + \sqrt{\left(\frac{\omega_0}{\alpha}\right)^2 + \frac{2d_r}{\alpha}} \; ;$$

where $d_r$ is the second travel distance, and $\alpha$ is a constant acceleration of the rotor following acceleration of the rotor to the second position, and $\omega_{T_{on}}$ is a velocity of the rotor following acceleration of the rotor to the second position.

7. An apparatus comprising:
   a controller that is adapted to derive an optimized drive pulse activation time for moving a rotor of a motor across a travel distance from a first position to a second position utilizing all available torque, based an modeling a response of a selected pair of motor windings to a sense pulse to determine the first position within the respective commutation state; and
   a motor driver circuit adapted to be responsive to the controller and adapted to apply a drive pulse to the motor for the optimized drive pulse activation time thereby advancing the rotor to the second position.

8. The apparatus of claim 7, in which the motor is a multi-phase motor with windings, and in which the controller applies a measurement current across the windings for a predetermined time, wherein the measurement current generates a pulse characterized by an inductive use time when applied across the winding, and wherein the measurement current is at a current level which precludes rotation of the rotor.

9. The apparatus of claim 7, in which the rotor is a stopped rotor, and in which the controller determines the travel distance in accordance with the following relation:

$$d_r = \frac{\frac{\pi}{x^i} * y}{B}$$

where $d_r$ is the travel distance, y is the value of the model at the first position, B is an intercept point of the model, and x is determined by an electrical revolution of the motor factored by one half a total number of commutation states comprising the electrical revolution.

10. The apparatus of claim 7, in which the controller further determines the activation time in relation to a torque constant of the motor.

11. The apparatus of claim 7, in which the rotor is a stopped rotor, and in which the controller derives the optimized drive pulse activation time ($T_{on}$) in accordance with the following relation:

$$T_{on} = \sqrt{\frac{2d_r}{\alpha}}$$

where $d_r$ is the travel distance, and $\alpha$ is a maximum acceleration the motor can deliver based on a torque constant of the motor, a total load placed on the motor, and an amount of inertia associated with the motor along with the total load placed on the motor.

12. The apparatus of claim 7, in which the rotor in the first position is a stopped rotor and in the second position is a rotor in motion, and wherein the controller further operates to obtain a second travel distance for the rotor in motion to move from the second position to a third position, derive a second optimized drive pulse activation time to accelerate the rotor in motion from the second position to the third position utilizing substantially all available torque, and wherein the driver circuit further operates to apply a second drive pulse to the motor for a dine substantially equal to the second optimized drive pulse activation time to advance the rotor in motion to the third position.

13. The apparatus of claim 12, in which the controller determines the second travel distance in accordance with the following relation:

$$d_r = \frac{\pi}{x} - \left| \frac{\frac{\pi}{x} * y}{B} \right|$$

where $d_r$ is the second travel distance, y is a value corresponding to the second position in a model of a response of the selected pair of windings to the sense pulse. B is an intercept of the model, and x is determined by an electrical revolution factored by one half a total number of commutation states comprising the electrical revolution.

14. The apparatus of claim 12, wherein the deriving the second optimized drive pulse activation time ($T_{on1}$) comprises deriving said activation time in accordance with the relation:

$$T_{on1} = t = -\frac{\omega_0}{\alpha} + \sqrt{\left(\frac{\omega_0}{\alpha}\right)^2 + \frac{2d_r}{\alpha}} \ ;$$

where $d_r$ is the travel distance, and $\alpha$ is a constant acceleration of the rotor following acceleration of the rotor to the second position, and $\omega_{T_{on1}}$ is a velocity of the rotor following acceleration of the rotor to the second position.

15. The apparatus of claim 7, further comprising back electromotive force (bemf) detection circuitry and wherein the controller accelerates the motor to an intermediate velocity at which the motor generates sufficient bemf to allow the bemf detection circuitry to detect motor velocity, after which the driver circuitry applies drive pulses to the motor to accelerate the motor from the intermediate velocity to a final operational velocity in relation to the detected bemf.

16. A method comprising:
   modeling a response of a pair of motor windings to a sense pulse to determine a first position of the rotor within a first commutation state;
   determining from the modeling step a travel distance for the rotor to move from the first position to a second position;
   deriving an optimized drive pulse activation time to accelerate the rotor from the first position to the second position utilizing substantially all available torque.

17. The method of claim 16, further comprising:
   determining a second travel distance for continued acceleration of the rotor from the second position to a third position;
   deriving a second optimized drive pulse activation time to continue acceleration of the rotor from the second position to the third position utilizing substantially all available torque.

* * * * *